(12) United States Patent
Mishra

(10) Patent No.: US 9,449,070 B2
(45) Date of Patent: Sep. 20, 2016

(54) CATEGORY MANAGER FOR SOCIAL NETWORK CONTENT

(71) Applicant: Offerpop Corporation, New York, NY (US)

(72) Inventor: Prakash Mishra, Stamford, CT (US)

(73) Assignee: Offerpop Corporation, New York, NY (US)

( * ) Notice: Subject to any disclaimer, the term of this patent is extended or adjusted under 35 U.S.C. 154(b) by 105 days.

(21) Appl. No.: 13/871,282

(22) Filed: Apr. 26, 2013

(65) Prior Publication Data

US 2013/0290337 A1    Oct. 31, 2013

Related U.S. Application Data

(60) Provisional application No. 61/638,905, filed on Apr. 26, 2012, provisional application No. 61/677,119, filed on Jul. 30, 2012.

(51) Int. Cl.
*G06F 17/30* (2006.01)
*G06Q 50/00* (2012.01)

(52) U.S. Cl.
CPC ..... *G06F 17/30598* (2013.01); *G06F 17/3089* (2013.01); *G06Q 50/01* (2013.01)

(58) Field of Classification Search
CPC .................. G06F 17/30864; G06F 17/30598
USPC ........ 709/204, 206, 217, 224; 707/722, 736, 707/740, 706, 723, 728, 732, 737, 710, 725, 707/726, 743, 748, 749, 758, 769; 715/753, 715/234, 716, 736, 748, 752, 758, 760, 715/813; 705/14.66, 319, 14.58, 14.1, 705/14.53, 14.57, 7.36, 14.16, 14.23, 14.35, 705/14.41, 14.46, 14.69, 2, 26.3, 26.35, 705/26.4, 26.7, 26.9, 27.1, 28, 321, 34, 39, 705/5, 7.14, 7.31; 706/12, 46, 11, 52
See application file for complete search history.

(56) References Cited

U.S. PATENT DOCUMENTS 8,117,067 B2    2/2012    Ketchum
8,122,020 B1 *  2/2012    Donsbach et al. ............ 707/732
(Continued)

FOREIGN PATENT DOCUMENTS

WO    2012016212    2/2012

OTHER PUBLICATIONS

John G. Breslin et al., "Towards Semantically-Interlinked Online Communities," The Semantic Web: Research and Applications Lecture Notes in Computer Science, vol. 3532, 2005, pp. 500-514.
(Continued)

*Primary Examiner* — Jay Morrison
*Assistant Examiner* — Ken Hoang
(74) *Attorney, Agent, or Firm* — Robert Plotkin, P.C.; Robert Plotkin

(57) ABSTRACT

A computer-based system enables categories to be associated with content in an online social networking system. A user of such a system posts a unit of content to such a system and associate one or more categories with that unit of content. As a result, the user-specified categories are stored in the social networking system in association with the posted content. When the posted content is displayed to users of the online social networking system, the categories associated with the posted content may or may not be displayed in association with the posted content. The set of categories associated with the posted content may be modified after the content is posted. Users other than the user who posted the content may be enabled to post other content within the same categories, but may be prevented from modifying those categories.

20 Claims, 3 Drawing Sheets

(56) References Cited

U.S. PATENT DOCUMENTS

| | | |
|---|---|---|
| 2003/0135415 A1 | 7/2003 | Nakamura |
| 2003/0215063 A1* | 11/2003 | Beasley et al. .............. 379/67.1 |
| 2008/0033776 A1 | 2/2008 | Marchese |
| 2008/0201188 A1 | 8/2008 | Heyman |
| 2009/0006415 A1 | 1/2009 | McAniff |
| 2009/0132341 A1 | 5/2009 | Klinger |
| 2009/0132373 A1 | 5/2009 | Redlich |
| 2010/0030648 A1 | 2/2010 | Manolescu |
| 2010/0088187 A1 | 4/2010 | Courtney |
| 2010/0269158 A1 | 10/2010 | Ehler |
| 2011/0014972 A1 | 1/2011 | Herrmann |
| 2011/0078584 A1 | 3/2011 | Winterstein |
| 2011/0087647 A1* | 4/2011 | Signorini .......... G06F 14/30867 707/709 |
| 2011/0093361 A1* | 4/2011 | Morales .................... 705/26.62 |
| 2011/0191417 A1 | 8/2011 | Rathod |
| 2011/0258049 A1 | 10/2011 | Ramer |
| 2012/0123859 A1 | 5/2012 | Gupta |
| 2012/0232998 A1* | 9/2012 | Schoen ...................... 705/14.66 |
| 2013/0024454 A1* | 1/2013 | Dunn ........................... 707/740 |
| 2013/0036169 A1* | 2/2013 | Quigley et al. ............... 709/204 |
| 2014/0250128 A1* | 9/2014 | Akin ................. G06F 17/30539 707/740 |

OTHER PUBLICATIONS

Jude Yew et al., "Learning by Tagging: Group knowledge formation in a self-organizing learning community," ICLS '06: Proceedings of the 7th international conference on Learning sciences (2006), pp. 1010-1011.

* cited by examiner

CATEGORY MANAGER FOR SOCIAL NETWORK CONTENT

CROSS-REFERENCE TO RELATED APPLICATIONS

This application claims the benefit of the following patent applications, all of which are incorporated by reference herein:
  U.S. Prov. Pat. App. Ser. No. 61/638,905, filed on Apr. 26, 2012, entitled, "Category Manager for Social Network Content"; and
  U.S. Prov. Pat. App. Ser. No. 61/677,119, filed on Jul. 30, 2012, entitled, "Category Manager for Social Network Content."

This application is related to U.S. Prov. Pat. App. Ser. No. 61/675,432, filed on Jul. 25, 2012, entitled, "Social Networking Advertising Campaign Management," which is hereby incorporated by reference herein.

BACKGROUND

Users of online social networking systems often use such systems to transmit messages to other users and to post content to such systems for sharing with other users. For example, the Facebook social networking system provides each registered user of the system with a personal page, known as a "wall" or "timeline," which displays a variety of information, such as personal information about the user, content posted by the user, and content posted by other users within the user's network on Facebook.

One of the primary goals of Facebook and other social networking systems is to facilitate the sharing of a wide variety of content among users in a wide variety of ways. One of the original reasons that users began using social networking systems was that they provided a convenient, user-friendly, easy way to engage in such content sharing, without requiring users to have knowledge of HTML or web programming, and without requiring users to visit different sites or use different mechanisms to share different kinds of content with other users.

For example, a user may use Facebook to transmit a message to one or a specified set of other users, in which case the message is only delivered and viewable by the specified user(s). As another example, a user may post content on the user's wall, thereby creating a "wall post," in which case anyone who is within the user's social network on Facebook (i.e., anyone who is a "friend" of the user on Facebook) may view the wall post. Wall posts may include, for example, text, images (such as digital photographs), audio, video, hyperlinks, and combinations thereof.

Whereas in the past users might have used email to send messages to individual friends, blogs to post short messages to the public or a wider group of friends, photo sharing sites (such as Flickr or Snapfish) to share photos, and so on. As a result of this power, flexibility, and ease of use, many users now solely use a social networking site such as Facebook to perform all of these functions through a single account and a single unified user interface. Another benefit of using a single social networking site to perform all of these functions is that all of the content shared by the user, and some or all of the content shared with the user by others, is available for viewing in a single location, such as the user's Facebook wall.

Many organizations, including for-profit and non-profit companies, government agencies, universities, and departments also use Facebook and other social networking sites to communicate with their members and to market and sell their products and services. Such organizations often take advantage of the various mechanisms for sharing content described above. In addition, such organizations often use the various kinds of advertising that Facebook offers to market their products and services. Organizations post information about upcoming and existing products and encourage their customers and potential customers to post comments about the organization and its products on the company's wall. Organizations also sponsor contests, quizzes, special offers, and other promotional activities on social networking sites. These and other activities are intended to create interest in the company's commercial offerings by encouraging users of social networking sites to engage in online conversations about those offerings and to share content related to those offerings with each other through the social networking sites.

As the preceding description makes clear, many companies and individuals now rely significantly or even solely on social networking sites for engaging in a wide variety of communication with their friends, colleagues, customers, and potential customers. Both the volume and variety of such communication has increased significantly since the early days of online social networking systems. As a result, one problem that organizations face is organizing and tracking their content on online social networking systems, including both content posted by the organization and content posted by users outside the organization in connection with content posted by the organization. Another problem that organizations face is generating reports about their content on online social networking systems, and how effectively (or ineffectively) such content affects the company's reputation and sales.

What is needed, therefore, are improved techniques for managing content in online social networking systems.

SUMMARY

A computer-based system enables categories to be associated with content in an online social networking system. A user of such a system posts a unit of content to such a system and associate one or more categories with that unit of content. As a result, the user-specified categories are stored in the social networking system in association with the posted content. When the posted content is displayed to users of the online social networking system, the categories associated with the posted content may or may not be displayed in association with the posted content. The set of categories associated with the posted content may be modified after the content is posted. Users other than the user who posted the content may be enabled to post other content within the same categories, but may be prevented from modifying those categories.

DETAILED DESCRIPTION

A computer-based system enables categories to be associated with content in an online social networking system. For example, a user of such a system may post a unit of content to such a system and associate one or more categories with that unit of content. As a result, the user-specified categories are stored in the social networking system in association with the posted content. When the posted content is displayed to users of the online social networking system, the categories associated with the posted content may or may not be displayed in association with the posted content. The set of categories associated with the posted content may be modified after the content is posted. Users other than the user who posted the content may be enabled to post other content within the same categories, but may be prevented from modifying those categories.

Figure 1:
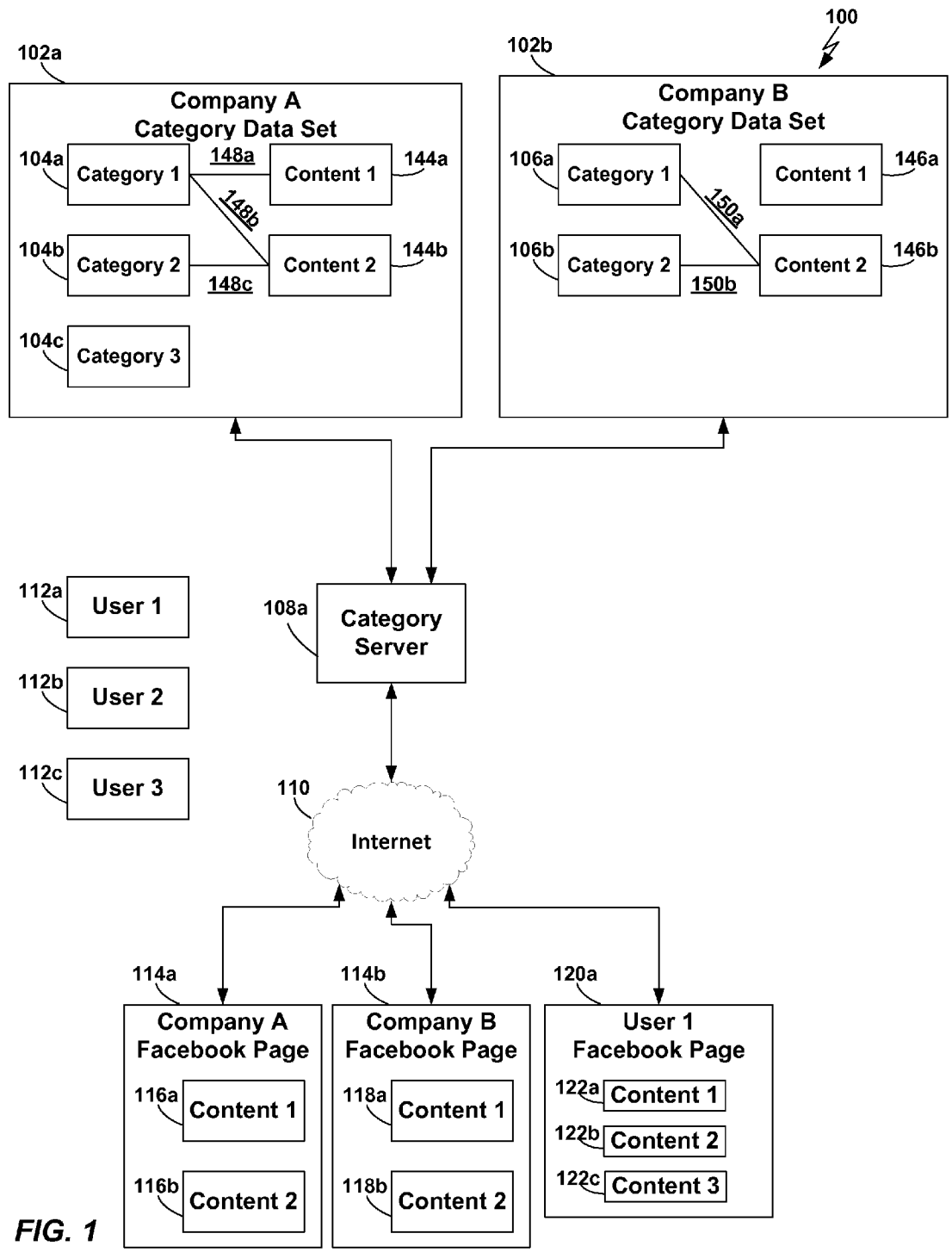
FIG. 1 is a dataflow diagram of a system for associating categories with content in online social networking systems according to one embodiment of the present invention.
Figure 2:
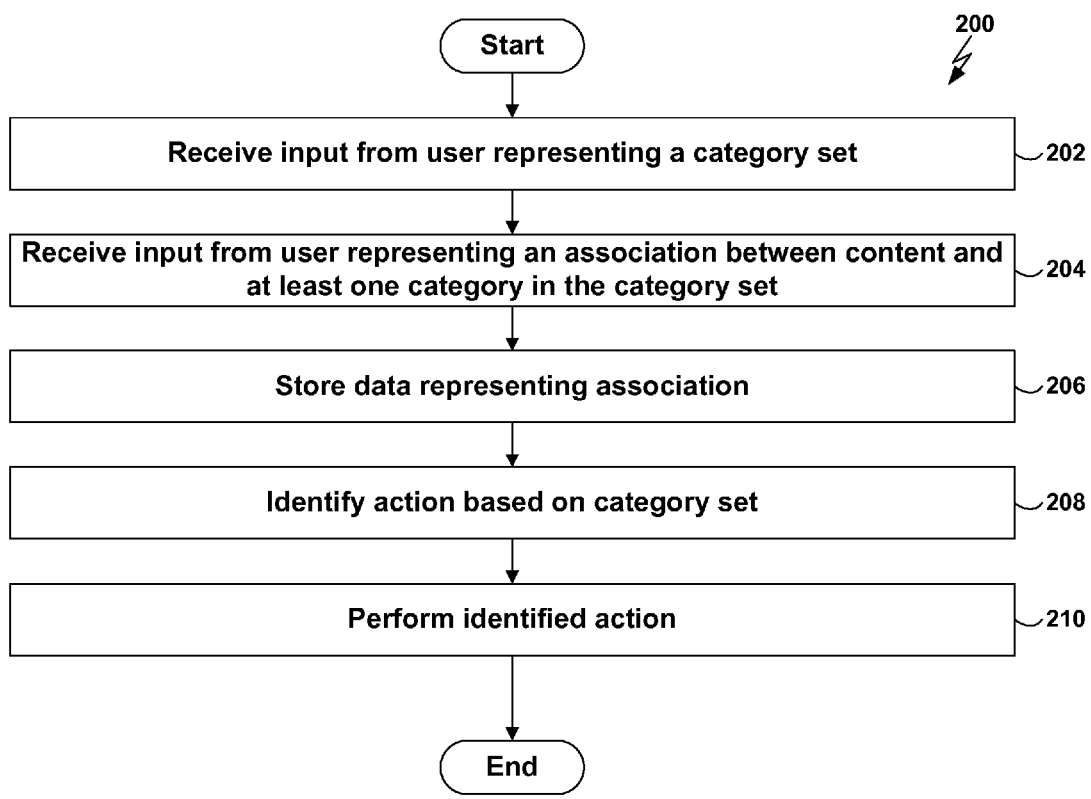
FIG. 2 is a flowchart of a method performed by the system of FIG. 1 to associate categories with content and to take actions based on the associated categories according to one embodiment of the present invention.
Figure 3:
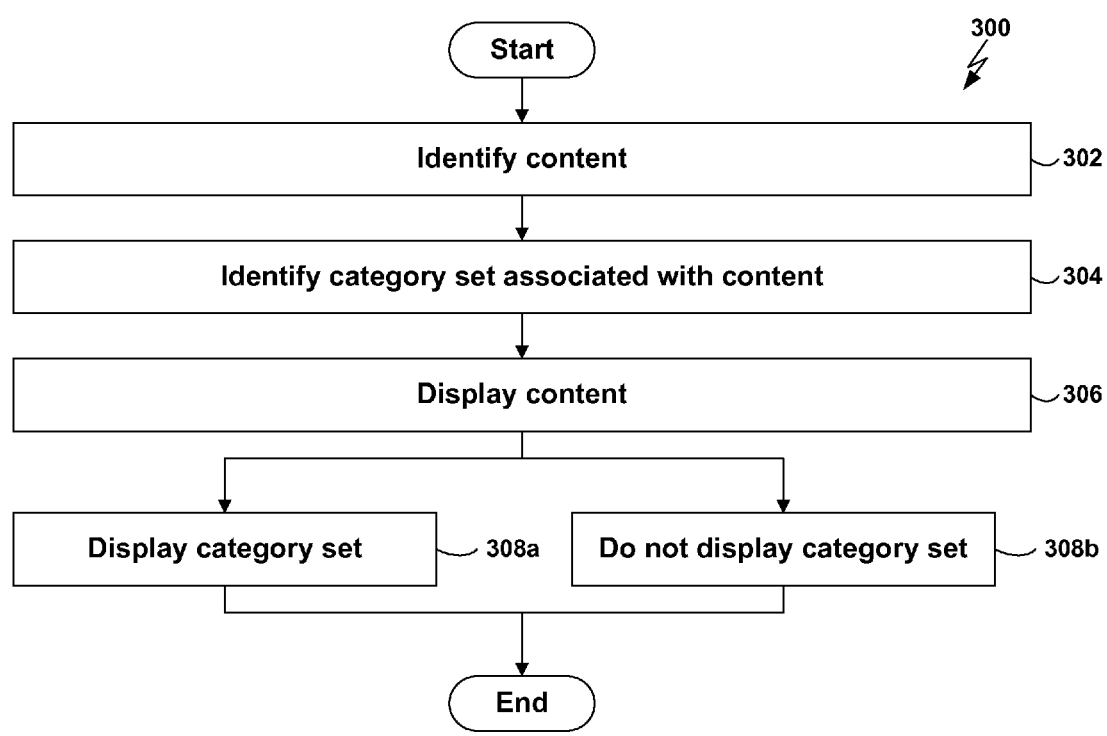
FIG. 3 is a flowchart of a method for displaying content and optionally displaying associated categories according to one embodiment of the present invention.

Referring to FIG. 1, a diagram is shown of a system 100 implemented according to one embodiment of the present invention. Referring to FIGS. 2 and 3, flowcharts are shown of methods 200 and 300, respectively, performed by the system 100 of FIG. 1 according to one embodiment of the present invention. The system 100 includes a plurality of sets of category data 102a-b. Although only two sets of category data 102a-b are shown in FIG. 1 for ease of illustration, the system 100 may include any number of category data sets. Furthermore, although category data set 102a is illustrated as being associated with a first company ("Company A") and category data set 102b is illustrated as being associated with a second company ("Company B"), this is merely an example. Category data sets 102a and 102b may, for example, be owned by, hosted by, or otherwise be associated with the same company. For example, category data set 102a may be a category data set associated with a first product or service of a company, and category data set 102b may be a category data set associated with a second product or service of the same company. As another example, category data set 102a may be a category data set associated with a first user or division within a company, and category data set 102b may be a category data set associated with a second user or division within the same company.

Furthermore, any reference herein to a "company" (such as Company A or Company B) should be understood to refer more generally to any entity, such as a for-profit or non-profit organization, or an individual person. In FIG. 1, therefore, Company A and Company B may refer to any two entities, whether or not companies.

Category data sets 102a and 102b contain a variety of category data. For example, category data set 102a contains three units of category data 104a-c (referred to herein simply as "categories" for ease of explanation). Each unit of category data 104a-c represents a distinct category of content. Although three categories 104a-c are shown in FIG. 1 for ease of illustration, any category data set may include any number of (i.e., zero or more) categories. The company associated with a category data set 102a may define the categories within the category data set 102a in any way that the company finds useful for categorizing the company's content. For example, if the company desires to post content relating to three of the company's products, then the company may choose to define the first category 104a as a category representing the first product, to define the second category 104b as a category representing the second product, and to define the third category 104c as a category representing the third product.

Category data may take any form. For example, a unit of category data may be a text string representing a corresponding category (e.g., the text string "movies," "offers," or "iPad"). As another example, category data may be a token representing an index into a database table containing database records representing categories. These are merely examples and do not constitute limitations of the present invention.

As illustrated in FIG. 1, a category may be associated with any number of (i.e., zero or more) units of content. Furthermore, any unit of content may be associated with any number of (i.e., zero or more) categories. In the particular example of FIG. 1, content 144a is associated with category 104a (as represented by connector 148a). As this example illustrates, a unit of content may be associated with exactly one category. Content 144b is associated with categories 104a and 104b (as represented by connectors 148b and 148c). As this example illustrates, a unit of content may be associated with a plurality of categories.

These examples also illustrate that a category may be associated with one unit of content (as illustrated by the association 148c between category 104b and content 144b), and that a category may be associated with multiple units of content (as illustrated by the associations 148a and 148b between category 104a and contents 144a and 144b, respectively). Finally, as illustrated in FIG. 1, category 104c is not associated with any content.

Turning now to the category data set 102b of Company B, and as illustrated in FIG. 1, content 146a is not associated with any category. As this example illustrates, a unit of content may be associated with zero categories. As further illustrated in FIG. 1, content 146b is associated with categories 106a and 106b (as represented by connectors 150a and 150b).

These examples also illustrate that different companies may have their own category data sets, which may be the same as or differ from each other in a variety of ways. For example, one or more categories may be shared by multiple companies. The system 100 may, for example, provide one or more categories that may or must be used by all companies that use the system. Alternatively, for example, categories may differ from company to company. For example, each company may define its own categories by providing any input representing such categories to the category server 108a in any manner (FIG. 2, operation 202). As a result, the category data set 102a of Company A may, for example, include none of the same categories as the category data set 102b of Company B.

The content within a category data set (e.g., content 144a-b and content 146a-b) may be any kind of content. For example, such content may be or include any one or more of the following in any combination: text, image, audio, video, hyperlinks, web pages or any portion thereof, messages (such as email messages, text messages, or any kind of message transmissible from one user to another user within an online social networking system), wall posts, and any kind of content that may be posted on or otherwise hosted by an online social networking system.

A category data set may include content itself (e.g., the content of a wall post) or information derived from such content or which otherwise points to or describes such content. For example, any of the content 144a-b and 146a-b within the category data sets 102a-b, respectively, may be a hyperlink or other reference to or descriptor of content stored in or otherwise hosted by an online social networking system. More generally, the content 144a-b and 146a-b may be any data that enables the category data sets 102a-b, respectively, to represent the associations between categories 104a-c and 106a-b and their corresponding content. As another example, a unit of content in a category data set may be a copy of content stored in or otherwise hosted by an online social networking system.

Associations between categories and content (e.g., associations 148a-c and associations 150a-b) may be stored in data structures in any kind of computer-readable medium. For example, associations may be stored as HTML hyperlinks. As another example, categories, content, and their associations may be stored in a data structure defined according to a programming language, in which case associations may be represented as pointers in accordance with that programming language.

A category data set and its components may be stored in any location(s). For example, the category data sets 102a-b in FIG. 1 are shown as containing their respective categories, associations, and contents. Such a scheme may be implemented by storing each category data set and its respective categories, associations, and contains in a single database, database record, or other data structure in a single computer-readable medium or computer system. Alternatively, for example, the data within a single category data set may be distributed across multiple databases, database records, data structures, computer-readable media, or computer systems. For example, the categories and associations in a category data set may be stored on one computing device, while the content in the category data set may be stored on another computing device. One example of such a scenario is that in which the contents in a category data set are stored by a social networking server, while the categories and associations in the category data set are stored by a separate category server.

In general, the category server 108a may be any hardware, software, or combination thereof for providing access to the category data sets 102a-b. In particular, the category server 108a may include means for receiving requests over the internet 110 to read data from the category data sets 102a-b (such as the categories 104a-b and 106a-b, the associations 148a-c and 150a-b, and the contents 144a-b and 146a-b) and for retrieving and providing such data to the requester. Furthermore, the category server 108a may include means for receiving requests over the internet 110 to write data to the category data sets 102a-b and for writing such data to the category data sets 102a-b in response.

Although only one category server 108a is shown in FIG. 1, this is merely an example and not a limitation of the present invention. Alternatively, for example, there may be a separate category server for each category data set 102a. As another example, the category server 108a may be integrated into one or more online social networking systems. As yet another example, the category server 108a may be implemented as an application executing on a social networking system.

As previously mentioned, the system 100 of FIG. 1 enables users of an online social networking system, such as Facebook, to associate categories with content posted on the online social networking system. Users may create the associations 148a-c and 150a-b by providing, to the system 100, any suitable input representing the associations 148a-c and 150a-b (FIG. 2, operation 204). In response to receiving such input, the system 100 may create and store one or more of the associations 148a-c and 150a-b (FIG. 2, operation 206). Now assume that Company A (i.e., the company associated with category data set 102a) is also associated with a Facebook page 114a, which contains content 116a and content 116b. Similarly, assume that Company B (i.e., the company that is associated with category data set 102b) is also associated with a Facebook page 114b, which contains content 118a and content 118b. Although only two Facebook pages 114a-b are shown in FIG. 1 for ease of illustration, the system 100 may include any number of Facebook pages. Furthermore, Facebook is used merely as an example of an online social networking system in FIG. 1. More generally, a company may be associated with any number of online social networks (e.g., zero, one, two, or more). Similarly, the particular number of contents 116a-b and 118a-b shown in FIG. 1 is merely an example and not a limitation of the present invention.

Furthermore, although elements 114a-b are labeled as "pages" in FIG. 1, this is merely an example and does not constitute a limitation of the present invention. As another example, elements 114a and 114b may be different subsets of the same Facebook page. As yet another example, elements 114a and 114b may be any form of content contained within Facebook or another online social networking system. For ease of explanation, however, elements 114a and 114b will be described herein as "Facebook pages."

A user of an online social networking site may use the system 100 of FIG. 1 to associate one or more categories with content in the user's online social networking account. The user may create such an association at any time, such as at the time of posting the content to the user's online social networking account, or after posting the content. For example, recall that Company A's category data set 102a includes categories 104a-c. Therefore, Company A (or any user who is authorized to access Company A's category data set 102a, as determined by any access control provisions defined by the category server 108a) may associate any one or more of categories 104a-c with content in Company A's online social networking account.

For example, assume that content 144a in Company A's category data set 102a is a link to content 116a in Company A's Facebook page 114a. In this example, category 104a is associated with content 116a in Company A's Facebook page 114a. Similarly, assume that content 144b in Company A's category data set 102a is a link to content 116b in Company A's Facebook page 114a. In this example, categories 104a and 104b are associated with content 116b in Company A's Facebook page 114a.

Similarly, assume that content 146a in Company B's category data set 102b is a link to content 118a in Company B's Facebook page 114b. In this example, no categories are associated with content 118a in Company B's Facebook page 114b. Further assume that content 146b in Company B's category data set 102b is a link to content 118b in Company B's Facebook page 114b. In this example, categories 106a and 106b are associated with content 118b in Company B's Facebook page 114b.

In general, whenever any of the units of content 144a-b or 146a-b is to be displayed (e.g., when one of the Facebook pages 114a-b is to be displayed), the system 100 may identify the unit of content to be displayed (FIG. 3, operation 302) and identify the category set associated with that unit of content based on the associations of the unit of content (FIG. 3, operation 304). The system may display the unit of content (FIG. 3, operation 306). When a user's online social networking content is displayed by the online social networking system, an indication of the category or categories, if any, that are associated with that content may also be displayed (e.g., near the associated content) (FIG. 3, operation 308a). For example, if content 116b is associated with the categories "Movies" and "Comedies," then when content 116a is displayed by an online social networking system, the words "Movies" and "Comedies" may be displayed near the content 116a.

Alternatively, for example, the category or categories associated with content may be hidden (not displayed) when the content is displayed to users other than the user who posted the content or other authorized users within the same organization (FIG. 3, operation 308b). For example, when authorized users of Company A edit content 116a-b on Company A's Facebook page 114a, the system 100 may display the categories associated with such content 116a-b to such users, but hide those categories when the content 116a-b is displayed on Company A's Facebook page to users outside Company A in non-edit mode.

As yet another example, each category may be designated as either public or private, in which case public categories may be displayed in connection with their associated content while private categories may remain hidden while their associated content is displayed. Operations 308a and 308b are shown in parallel in FIG. 3 to indicate that either operation 308a or operation 308b may be performed, not to indicate that both such operations 308a-b are performed.

The system 100 may enable a user to add, modify, or delete categories from its category set at any time. Furthermore, the system 100 may enable a user to add, modify, or delete categories associated with a particular unit of content at any time. For example, in FIG. 1, content 116b is associated with categories 104a and 104b (because content 116b in Company A's Facebook page corresponds to content 144a in Company A's category data set). Company A, or a user associated with Company A, may subsequently add an association between content 116b (i.e., content 144b) and category 104c. As another example, Company A, or a user associated with Company A, may subsequently delete the association between content 116b (i.e., content 144b) and category 104a or category 104b. As yet another example, Company A, or a user associated with Company A, may modify one of the categories associated with content 116b, such as by modifying the name or other property of such a category.

Furthermore, the system 100 may include one or more predefined system categories. The system 100 may make such system categories available to some or all users of the system 100. As a result, such users may associate such system categories with their own content. For example, Company A may associate one or more system categories with any one or more units of Company A's content (such as content 116a and/or content 116b). One benefit of providing such system categories is that they enable users to begin using categories quickly, without the need to define their own categories. Another benefit of providing such system categories is that the system administrator may create the system categories to reflect categories that have been found to be useful by many users of the system 100. Other users of the system 100 may therefore be particularly likely to find the system categories useful. Yet another benefit of providing such system categories is that they may be used to enforce consistent use of categories across some or all users of the system 100. For example, the system 100 may require that each categorized unit of content in the system 100 be associated with at least one system category. This enables the system 100 to generate reports based on aggregate data for a set of consistently-defined system categories across multiple users of the system 100.

The system 100 may display category-associated content to users of the online social networking system. For Example, the system 100 may display Company A's Facebook page, including the contents 116a-b of that page 114a and (optionally) including the categories associated with the contents 116a-b of that page 114a. The users to whom such content is displayed may or may not have any association with Company A. For example, FIG. 1 shows a user 112a, who may be any user of Facebook, whether or not user 112a is associated with Company A. The system 100 may display Company A's Facebook page, including the contents 116a-b of that page 114a and (optionally) including the categories associated with the contents 116a-b of that page 114a, to user 112a.

The system 100 may, however, prevent the user 112a from modifying the category data set 102a of Company A. For example, the system 100 may prevent the user 112a from adding, deleting, or modifying categories within Company A's category data set 102a. As another example, the system 100 may prevent the user 112a from adding, deleting, or modifying any of the associations 148a-c between categories 104a-c in the category data set 102a and the contents 144a-b of that data set 102a. In other words, the system 100 may display category information to users outside Company A but prohibit such users may modifying such category information. In particular, the system 100 may only permit certain authorized users of Company A to modify data in Company A's category data set 102a, where Company A may select and designate such authorized users in any manner.

In some embodiments of the present invention, however, some users who are not authorized users of Company A may nevertheless be permitted by the system 100 to associate categories in Company A's category data set 102a with content posted by such users to the online social networking system. For example, the system 100 may permit user 112a to post content to Company A's Facebook page 114a and to associate one or more categories 104a-c from Company A's category data set 102a with that content. As another example, the system 100 may permit user 112a to post content to user 112a's Facebook page 120a (such as any of content 122a-c) and to associate one or more categories 104a-c from Company A's category data set 102a with that content. The system 100 may permit user 112a, and other users 112b-c of the system 100, to perform similar functions in connection with categories 106a-b from Company B's category data set 102b.

Categories may be used for purposes in addition to those described above. For example, embodiments of the present invention may implement an automatic association between a category and a corresponding location or data structure for storing content associated with that category on one or more online social networking systems. For example, embodiments of the present invention may implement an association between a particular category, such as a "wedding photos" category, and a user's photo album named "Wedding Photos." Once such an associated has been created, embodiments of the present invention may perform a variety of actions. For example, if the user who is associated with the "wedding photos" category and the "Wedding Photos" photo album posts a photo to the online social networking system and associates the "wedding photos" category with the photo but does not post the photo into the "Wedding Photos" album, an embodiment of the present invention may nevertheless post the photo into the "Wedding Photos" photo album automatically in response to detecting that the photo has been associated with the "wedding photos" category, because of the association between the "wedding photos" category and the "Wedding Photos" photo album.

Conversely, if the user who is associated with the "wedding photos" category and the "Wedding Photos" photo album posts a photo into the "Wedding Photos" photo album on the online social networking system but does not associate the "wedding photos" category with the photo, an embodiment of the present invention may nevertheless associate the "wedding photos" category with the photo automatically in response to detecting that the photo has been posted into the "Wedding Photos" photo album, because of the association between the "wedding photos" category and the "Wedding Photos" photo album.

In the example above, the association between category and storage location (e.g., photo album) is bi-directional. This is merely an example, however. Such associations may be unidirectional, either from category to storage location, or from storage location to category.

In the example above, the storage location is a photo album. This is merely an example, however. Other examples of storage locations that may be associated with categories include, but are not limited to, walls, blogs, and like pages. More generally, any classification scheme used by any Internet-based service that allows users to post content may be a "storage location" as that term is used herein. As a result, "storing" a unit of content in a storage location may consist of or include applying a classification scheme to the unit of content. As just one example, the Instagram service, which enables users to upload digital photos, enables hashtags to be used to designate categories of photos. A particular hashtag (such as "#car") may be considered a "storage location" because it is possible to search Instagram for all photos associated with the hashtag "#car" and to obtain, in response to the search, all photos associated with the hashtag "#car". The "#car" hashtag therefore behaves the same as or similarly to a subdirectory or other storage location. Embodiments of the present invention may generate, store, and use a mapping between Instagram hashtags and categories in the system 100. For example, the system 100 may include a mapping between the Instagram hashtag "#car" and a "car" category. If content is posted to the system 100 and associated with the "car" category, the system 100 may automatically post the same content to the Instagram service with the Instagram hashtag "#car", based on the mapping.

The user who posts content that triggers an action of the kind described above need not be the owner of the category or location into which the content is posted. For example, consider an example in which Ford Motor Company is associated with and is therefore the owner of a set of categories and a Facebook wall. If a user outside of Ford posts a wall post onto Ford's Facebook wall, then an embodiment of the present invention may automatically associate a category owned by Ford (such as the category "Ford") with the wall post, because of the association between the "Ford" category and the Ford Facebook wall. Conversely, if a user outside of Ford associates the category "Ford" with a wall post outside of Ford's wall (e.g., on the user's personal wall), an embodiment of the present invention may automatically copy the wall post onto Ford's wall, because of the association between the "Ford" category and the Ford Facebook wall.

In general, any of a variety of actions may be triggered and performed automatically by embodiments of the present invention in response to detecting that content on a social networking system has been associated with a particular category (FIG. 2, operations 208 and 210). For example, an embodiment of the present invention may associate a background image of balloons with a "birthday photo" category. If a user of a social networking system posts a photo and associates the "birthday photo" category with the photo, an embodiment of the present invention may automatically superimpose the photo onto the background image of balloons, because of the association between the "birthday photo" category and the background image of balloons. Such an action may be taken in connection with any number of users who associate the "birthday photo" category with images that they post to the social networking system.

As another example, embodiments of the present invention may take actions in connection with online social networking systems, such as Twitter, that use hashtags. For example, if a user posts (tweets) a message containing a hashtag, such as the hashtag "#idea" in the tweet, "I have an #idea, how about free shipping on orders over $25?," an embodiment of the present invention may automatically associate the tweet with an "idea" category, because of the association between the "#idea" hashtag and the "idea" category.

Conversely, if a user uploads a photo with the caption, "I love this dress" and associates the category "wedding photos" with the photo, an embodiment of the present invention may automatically generate and post the tweet, "#wedding-photos I love this dress," with a link to the posted photo, because of the association between the "wedding photos" category and the "#wedding-photos" hashtag.

Embodiments of the present invention may automatically assign a category to a unit of content in any of a variety of ways. For example, embodiments of the present invention may learn how a particular user has assigned categories to units of content in the past and apply that learning to automatically assign one or more categories to a unit of content created, posted, or modified by the user. Such learning may be performed in any of a variety of ways. For example, for each of a plurality of units of content created, posted, or modified by the user, embodiments of the present invention may identify: (1) one or more attributes (e.g., keywords, time posted, attachments) of the units of content; and (2) the categories manually assigned by the user to the units of content. Embodiments of the present invention may apply any machine learning technique (e.g., naïve Bayes classification) to such attributes and manually assigned categories to automatically identify associations (e.g., correlations) between such attributes and manually assigned categories. When the user and/or other users subsequently create, post, or modify other units of content, embodiments of the present invention may use the identified associations to automatically apply categories to the new units of content. More generally, embodiments of the present invention may learn associations based on manual categorizations applied by a plurality of users to a plurality of units of content.

Although certain embodiments are described herein as being applied to a single online social networking system, such as Facebook, this is merely an example and does not constitute a limitation of the present invention. Alternatively, for example, the system 100 may enable a single category data set, such as either or both of category data sets 102*a* and 102*b*, to be used in connection with a plurality of online social networking systems to perform any of the functions disclosed herein.

Embodiments of the present invention have a variety of advantages. For example, once categories have been associated with a company or other user's content, that user may use embodiments of the present invention to search for content (e.g., wall posts) by category and otherwise generate reports based on categories associated with the company's content. For example, the user may search for all wall posts associated with a particular category (e.g., finance) or run a report of the user's most popular categories, as measured by the number of walls posts that have received the largest number of comments from other users.

Users who wish to use categories solely for such reporting functions may do so without exposing their categories to the public by keeping such categories hidden using the techniques described above. In this way, embodiments of the present invention enable users to associate private categories with publicly-available content for the purposes of privately tracking features of such content, such as the kind and extent of user interaction with such content. Embodiments of the present invention enable categories to be used to generate reports in any of a variety of ways. For example, a user of the system may use embodiments of the present invention to generate reports that track all of the user's content by category, reports that track responses to the user's content by category of the responses, and reports that track responses to the user's content by demographic characteristics of the respondents who respond to different categories of content.

The ability of embodiments of the present invention to enable a user to prevent members of the public from modifying (e.g., adding, changing, or deleting) the categories associated with the user's content provides the user with the ability to allow members of the public to post content to the user's account (e.g., Facebook wall) and to associate such content with the user's categories, but without modifying those categories. This gives the user a high degree of control over the categories that other users associate with content posted within the user's account (e.g., Facebook wall) and with content otherwise associated with the user. This may be particularly valuable for a company that wishes to allow members of the public to post content on the company's Facebook wall. The ability to prevent members of the public from creating and associating their own categories with such content enables the company to prevent members of the public from associating disparaging or irrelevant categories with such content, and also enables the company to make the best use of reports that were designed to report on the set of categories created by the company.

Yet another benefit of embodiments of the present invention is their ability to enable a single set of categories to be used across multiple online social networking systems. For example, a company may create a single set of categories and then use that set of categories in connection with content of the company on Facebook and Twitter. This eliminates the need for the company to create and maintain multiple sets of categories. This feature is particularly valuable for companies that wish to quickly and easily post and maintain the same or similar content on multiple online social networking systems.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The description herein refers to certain online social networking systems, such as Facebook and Twitter, merely for purposes of example. Embodiments of the present invention are not limited to use in conjunction with these particular online social networking systems, but instead may be used in conjunction with any one or more online social networking systems. More generally, embodiments of the present invention may be used in conjunction with any online system for hosting content, such as any web site. Therefore, any reference herein to an "online social networking system" should be understood to refer more generally to any online system for hosting content, whether or not such a system includes social networking features.

Any reference herein to a "product" should be understood to refer to a product and/or a service. Similarly, any reference herein to a "service" should be understood to refer to a product and/or a service.

Certain concepts described herein may be known by other names. For example, a "wall" on Facebook or other social networking system may also be referred to as a "timeline." As another example, a "wall post" on Facebook or other social networking system may also be referred to as a "story." Therefore any reference to a "wall," "wall post," or other concept that is also known by other names should be understood to refer to the concept generally, regardless of the name by which it is referred.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer process executing computer program instructions stored on at least one non-transitory computer-readable medium, the method comprising:
   (A) receiving, from a first user of an online social networking system and into a category server, category data set data representing a first set of categories;
   (B) receiving input from the first user indicating an association between first content hosted on the online social networking system and at least one of the categories in the first set of categories;
   (C) storing, in a data structure of the category server, association data representing the association between the first content and the at least one of the categories; and
   (D) receiving input from the first user indicating an association between second content hosted on a second online social networking system and at least one of the categories in the first set of categories;
   (E) storing, in said data structure of the server, association data representing the association between the second content and the at least one of the categories;
   (F) receiving, from a second user of the online social networking system, input representing a modification to the at least one of the categories; and
   (G) in response to the input representing the modification, modifying one or more of the association data representing the association between the first content and the at least one of the categories and the association data representing the association between the second content and the at least one of the categories.

2. The method of claim 1, wherein the at least one of the categories comprises a plurality of categories.

3. The method of claim 1, further comprising:
   (H) receiving the first content from the first user; and
   (I) posting the first content on the online social networking system.

4. The method of claim 1, further comprising:
   (H) displaying the first content without displaying the at least one of the categories.

5. The method of claim 1, further comprising:
   (H) displaying the first content and the at least one of the categories.

6. The method of claim 1, further comprising:
   (H) identifying an action based on the at least one of the categories; and
   (I) performing the action.

7. The method of claim 6:
   wherein (H) comprises identifying a storage location based on the at least one of the categories; and
   wherein (I) comprises storing the first content in the identified storage location.

8. The method of claim 7, wherein storing the first content in the identified storage location comprises applying a classification scheme to the first content.

9. The method of claim 8, wherein applying the classification scheme to the first content comprises applying a hashtag to the first content.

10. The method of claim 1, wherein the online social networking system comprises Facebook, and wherein the second online social networking system comprises Twitter.

11. A system comprising at least one non-transitory computer-readable medium having computer program instructions stored thereon, the computer program instructions being executable by at least one computer processor to perform a method, the method comprising:
    (A) receiving, from a first user of an online social networking system and into a category server, category data set data representing a first set of categories;
    (B) receiving input from the first user indicating an association between first content hosted on the online social networking system and at least one of the categories in the first set of categories;
    (C) storing, in a data structure of the category server, association data representing the association between the first content and the at least one of the categories; and
    (D) receiving input from the first user indicating an association between second content hosted on a second online social networking system and at least one of the categories in the first set of categories;
    (E) storing, in said data structure of the category server, association data representing the association between the second content and the at least one of the categories;
    (F) receiving, from a second 	user of the online social networking system, input representing a modification to the at least one of the categories; and
    (G) in response to the input representing the modification, modifying one or more of the association data representing the association between the first content and the at least one of the categories and the association data representing the association between the second content and the at least one of the categories.

12. The system of claim 11, wherein the at least one of the categories comprises a plurality of categories.

13. The system of claim 11, wherein the method further comprises:
    (H) receiving the first content from the first user; and
    (I) posting the first content on the online social networking system.

14. The system of claim 11, wherein the method further comprises:
    (H) displaying the first content without displaying the at least one of the categories.

15. The system of claim 11, wherein the method further comprises:
    (H) displaying the first content and the at least one of the categories.

16. The system of claim 11, wherein the method further comprises:
    (H) identifying an action based on the at least one of the categories; and
    (I) performing the action.

17. The system of claim 16:
    wherein (H) comprises identifying a storage location based on the at least one of the categories; and
    wherein (I) comprises storing the first content in the identified storage location.

18. The system of claim 17, wherein storing the first content in the identified storage location comprises applying a classification scheme to the first content.

19. The system of claim 18, wherein applying the classification scheme to the first content comprises applying a hashtag to the first content.

20. The system of claim 11, wherein the online social networking system comprises Facebook, and wherein the second online social networking system comprises Twitter.

* * * * *